(12) United States Patent
Mettlach et al.

(10) Patent No.: US 8,716,381 B2
(45) Date of Patent: May 6, 2014

(54) THERMOPLASTIC MOLDING COMPOSITION

(75) Inventors: Claudia Mettlach, Trier (DE); Martin Weber, Maikammer (DE); Christian Maletzko, Altrip (DE); Bernd Trotte, Hemsbach (DE)

(73) Assignee: BASF SE (DE)

( * ) Notice: Subject to any disclaimer, the term of this patent is extended or adjusted under 35 U.S.C. 154(b) by 0 days.

(21) Appl. No.: 13/548,698

(22) Filed: Jul. 13, 2012

(65) Prior Publication Data

US 2014/0017427 A1    Jan. 16, 2014

(51) Int. Cl.
*C08K 5/41* (2006.01)

(52) U.S. Cl.
USPC .............. 524/171; 524/167; 524/170

(58) Field of Classification Search
USPC ......... 428/35.7, 36.9, 419; 524/167, 170, 171
See application file for complete search history.

(56) References Cited

FOREIGN PATENT DOCUMENTS

| GB | 1078234 A | 8/1967 |
|----|-----------|--------|
| GB | 2 088 396 A | 6/1982 |
| JP | 2003073303 A | 3/2003 |
| WO | WO-03/089520 A1 | 10/2003 |
| WO | WO-2005095491 A1 | 10/2005 |

*Primary Examiner* — Michael C Miggins
(74) *Attorney, Agent, or Firm* — Novak Druce Connolly Bove + Quigg LLP

(57) ABSTRACT

The present invention relates to the use of a molding composition for producing a feed container consisting essentially of a copolymer composed of (A) from 5 to 60% by weight of units of the formula (I)

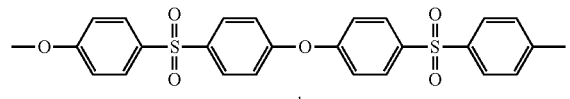

and (B) from 40 to 95% by weight of units of the formula (II)

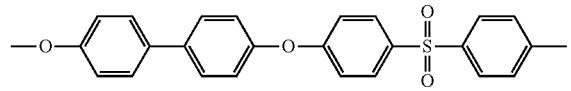

where the total of the proportions by weight is 100% by weight, based on the copolymer, and where the demolding force of the molding composition is from 1800 to 2800 N.

6 Claims, No Drawings

THERMOPLASTIC MOLDING COMPOSITION

CROSS-REFERENCE TO RELATED APPLICATIONS

This application claims the benefit of U.S. Provisional Application 61/507,631, filed Jul. 14, 2011, which is incorporated herein by reference.

BACKGROUND OF THE INVENTION

The present invention relates to the use of a molding composition for producing a feed container consisting essentially of a copolymer composed of
(A) from 5 to 60% by weight of units of the formula (I)

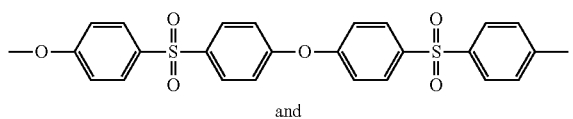

and (B) from 40 to 95% by weight of units of the formula (II)

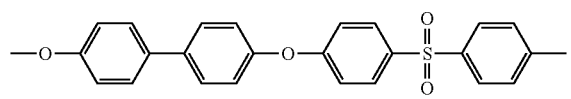

where the total of the proportions by weight is 100% by weight, based on the copolymer, and where the demolding force of the molding composition is from 1800 to 2800 N.

A field of increasing importance is the provision of molding compositions which meet stringent mechanical requirements and at the same time do not emit any substances into the contents of the feed container.

WO 03/089520 A1 has described the use of polyaryl ether sulfones, in particular polyether sulfones and polyphenyl sulfones, and also of miscible molding compositions therefrom, for producing medical moldings, inter alia baby bottles.

JP 2003 73303 discloses branched polydiphenyl ether sulfones which according to said disclosure are suitable inter alia for producing feed bottles.

GB 2 088 396 discloses copolymers having PESU and PPSU units. WO 2005/0954 91 also discloses copolymers having PESU and PPSU units.

DETAILED DESCRIPTION OF THE INVENTION

It was an objective of the present invention to provide molding compositions which comprise polyether sulfone and which should comply with the stringent processing requirements when feed bottles are produced. In particular, the molding composition should be suitable for producing feed bottles in various injection stretch blow molding processes and/or injection blow molding processes. In particular, the molding composition should be suitable for producing feed containers in an injection blow molding process.

In order to meet the requirements of the injection blow molding process, the molding composition should have maximum viscosity, to give a uniform wall of the feed bottle. In order to avoid defects in the feed bottle, the molding composition should ensure easy release of the molding composition from the production apparatus.

At the same time, the intention was to develop a molding composition which complies with the stringent mechanical requirements. Feed containers produced from the molding composition should have maximum stability when subjected to impact and when dropped.

It was therefore an object to develop a molding composition which has low demolding force. At the same time, the molding composition should exhibit advantageous viscosity in the melt. However, the molding composition should also at the same time comply with stringent mechanical requirements, such as notched impact resistance. In particular, the molding compositions should also be transparent, for use in the feed bottle sector.

Surprisingly, an appropriate molding composition has been discovered, and consists essentially of a copolymer, where the copolymer is composed of
(A) from 5 to 60% by weight of units of the formula (I)

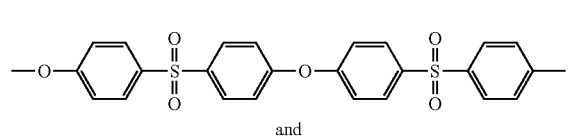

and (B) from 40 to 95% by weight of units of the formula (II)

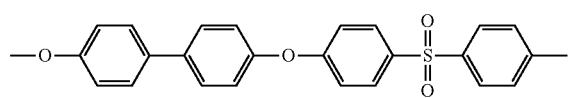

where the total of the proportions by weight of the units A and B is 100% by weight, based on the copolymer, and where the demolding force of the molding composition is from 1800 to 2800N.

The term "copolymer" also of course covers a mixture of copolymers made of the units A and B, where these have different terminal groups.

For the purposes of the invention, the units of formula (I) are also termed PESU units. For the purposes of the invention, the units of formula (II) are also termed PPSU units. The abbreviations such as PPSU and PESU used for the purposes of the present invention are in accordance with ISO 1043-1: 2001.

In one preferred embodiment, the molding composition comprises a copolymer composed of from 5 to 50% by weight of units (A) of formula I, particularly preferably from 5 to 40% by weight, for example from 8 to 40% by weight, in particular from 8 to 35% by weight, for example from 9 to 31% by weight, of units (A) of formula I, where the total of the proportions by weight of the units A and B is 100% by weight, based on the copolymer.

In one preferred embodiment, the molding compositions comprise copolymers composed of from 95 to 50% by weight of units (B) of formula II, particularly preferably from 95 to 60% by weight, for example from 92 to 60% by weight, in particular from 92 to 65% by weight, for example from 81 to 69% by weight, of units (B) of formula II, where the total of the proportions by weight of the units A and B is 100% by weight, based on the copolymer.

Production processes which lead to the abovementioned copolymer are known per se to the person skilled in the art. One production process is described by way of example in GB 1 078 234.

One preferred production process is described in Herman F. Mark "Encyclopedia of Polymer Science and Technology", third edition, volume 4, 2003, pages 2 to 8, and also in Hans R. Kricheldorf "Aromatic Polyethers" in: Handbook of Polymer Synthesis, second edition, 2005, pages 427 to 443.

The copolymer used is very particularly preferably produced by reacting at least one aromatic compound having two halogen substituents, e.g. dichlorodiphenyl sulfone, and at least two different aromatic compounds having two functional groups which are reactive toward abovementioned halogen substituents, e.g. dihydroxybiphenol and dihydroxydiphenyl sulfone, in aprotic polar solvents in the presence of anhydrous alkali metal carbonate, in particular sodium carbonate, potassium carbonate, calcium carbonate, or a mixture thereof, very particular preference being given here to potassium carbonate. One particularly suitable combination is N-methylpyrrolidone as solvent and potassium carbonate as base.

The weight-average molar masses $M_w$ of the copolymer of the present invention are preferably from 40 000 to 90 000 g/mol.

The demolding force of the molding composition of the invention is from 1800 to 2800 N, preferably from 1900 to 2700 N. The demolding force results mainly from the specific constitution, but can be influenced via the specific process used.

The melt volume flow rate of the molding composition can moreover be from 40 to 70 $cm^3$/10 min preferably from 45 to 60 $cm^3$/10 min, measured for 360° C./5 kg to EN ISO 1133: 2005.

The intrinsic viscosity of the molding composition measured to ISO 1628-2:1998 can be from 45 to 65 ml/g, in particular from 48 to 62 ml/g.

The haze value of test specimens produced from the molding composition can be from 2.0 to 4.5, in particular from 2.0 to 4.0, measured to DIN 53236.

A test specimen made of the molding composition of the invention is moreover preferably transparent. The transparency of the test specimen can preferably be from 70% to 99%, in particular from 75% to 90%, measured to DIN 53236.

Another feature of the molding composition of the invention is its advantageous apparent viscosity. Table 3 shows this by way of example for three molding compositions of the invention.

Various injection stretch blow molding and/or injection blow molding processes can be used to produce feed containers.

When feed containers are produced from the molding composition of the invention by the injection blow molding process, injection molding is generally first used to produce a cylindrical parison with the subsequent mouth region and subsequent seal region from the molding composition of the invention, this being demolded above the softening point/glass transition temperature. The parison remains on the mandrel (mold core) and is transferred into the blow mold, and forced by means of compressed air from the mandrel (mold core) into the shaping blow mold. The forming process can utilize heat from the injection molding process, and this means that the parison does not have to be heated.

The MVR and IV, and also the shear viscosity, of the molding composition of the invention are so advantageous that the amount of product scrapped during production of the resultant feed containers is particularly small. Another particular factor contributing to this is the low demolding force, which ensures that the feed containers can be released from the production apparatus with particularly little damage. In particular, the feed containers produced from the molding composition of the invention can be released easily from the mandrel (mold core), and damage can therefore be avoided when the feed container is forced from the mandrel (mold core) by means of compressed air.

The molding composition of the invention can also be processed to give feed containers in the injection stretch blow molding process. The process is suitable, for example, for producing thin-walled, high-transparency bottles.

In the injection stretch blow molding process, a parison is produced from the molding composition and is heated. In the blowing unit that follows, the parisons are stretched longitudinally by means of a stretching mandrel. At the same time, the parison is stretched in circumferential direction by a small preblowing pressure. Finally, the product is blown to its final shape.

Feed containers produced from the molding composition of the invention are preferably open or closed containers, for example vessels. A container is an article which has, in its interior, a cavity which serves in particular to separate its contents from its environment. A vessel is a device with a stiff and rigid shell which can enclose contents of varying consistency (DIN 28005).

The feed containers can have the shape of bottles, and for the purposes of this specification the latter are termed feed bottles. Feed bottles are containers and/or vessels which have relatively small diameter in relation to their height, and/or have a flat base. The conically tapering end of a bottle terminates in a round aperture. A cover can be used to close the round aperture.

The feed bottle can be a wide-neck or narrow-neck bottle. The expression "narrow-neck bottle" means a feed bottle in which the diameter of the aperture is markedly smaller than the average internal diameter of the storage space.

If the feed bottle has a closure, it has by way of example a cap closure, a screw-thread closure, a click-closure system, or an inserted closure, preferably a screw-thread closure or a click-closure system.

In one particular embodiment, there is a passifier-like suction apparatus which has been attached to the feed bottle and which serves to supply liquid nutrition for animals or humans, in particular infants.

Familiar sizes of feed bottles for human use are 125 ml, 240 ml, and 330 ml. However, other sizes of the feed bottle are also possible.

EXAMPLES

Standards
SN EN ISO 1043-1:2001: Plastics—Symbols and abbreviated terms—Part 1: Basic polymers and their special characteristics (ISO 1043-1:2001).
ISO 1628-2:1998: Plastics—Determination of the viscosity of polymers in dilute solution using capillary viscometers; EN ISO 1628-2:1998.
ISO 1133:2005: Plastics—Determination of the melt mass-flow rate (MFR) and the melt volume-flow rate (MVR) of thermoplastics; EN ISO 1133:2005.
ISO 527-2:1993 inclusive of Corr. 1:1994: Plastics—Determination of tensile properties—Part 2: Test conditions for molding and extrusion plastics; EN ISO 527-2:1996.
ISO 179-2:1997: Plastics—Determination of Charpy impact properties—Part 2: Instrumented impact test; EN ISO 179:1999.

DIN 53236: Testing of coloring materials; conditions of measurement and evaluation for the determination of color differences for paint coatings, similar coatings and plastics.

DIN 28005: General tolerances for containers.

Analysis Methods

Intrinsic viscosity (IV) measured to ISO 1628 in 1% NMP solution.

Melt volume flow rate (MVR) measured to ISO 1133 for 365° C./5 kg.

Modulus of elasticity and tensile strain at break measured to ISO 527-2.

Notched impact resistance measured to ISO 179/1eA.

Transparency, color factor, haze, YI measured to DIN 53236.

Apparent viscosity: Apparent shear rate was determined using a Götffert capillary viscometer (Rheograph 2003). Measurement geometry was as follows: Length of circular capillary=30 mm, radius=0.5 mm, L/R=60. Measurement temperature was 370° C., and shear rate range was from 57-11 000/s. The selected preheating time was 5 min. The specimens were prepared for more than 5 days at 125° C. For the Rheograph 2003 tests, a plastics melt was forced by a piston through a capillary with completely circular cross section of defined dimension, with prescribed volume throughput, and the extrusion pressure was measured. The apparent shear rate was determined from the volume throughput, and the shear stress at the wall was determined from the pressure. These two values were used to calculate apparent viscosity. (The calculation can use the method of M. Pahl, W. Gleißle, H. M. Laun: Praktische Rheologie der Kunststoffe and Elastomere [Practical rheology of plastics and elastomers], VDI Verlag, Dusseldorf, 1991, pp. 161 ff.).

Demolding force was measured as follows: Demolding force is measured on a cylindrical molding. (The dimensions of the demolding capsule are as follows: External diameter: 86 mm, height: 60 mm, wall thickness: from 1.5-2.5 mm.)

The mold had three piezoceramic force sensors to measure the force needed to force the molding away from the core with no skewing. The clamping force of the injection molding machine was 1000 kN and its screw diameter was 30 mm. The forces at the three force sensors were measured over the demolding distance covered by the ejector. The variables recorded here were the maximum force and the demolding energy required to force the molding away from the core. The ejector velocity here was 15 mm/s, the temperature of the composition was 360° C., and the temperature of the mold was 100° C. Each of the measurements was repeated ten times. The values stated in the table are the average values for maximum force from the ten measurements.

Materials Used:

Dichlorodiphenyl sulfone (DCDPS)

Dihydroxybiphenol (DHBP)

Dihydroxydiphenyl sulfone (DHDPS)

Potash ($K_2CO_3$, ground)

N-Methyl-2-pyrrolidone (NMP)

PPSU for comparative experiments: Mw=69 000 g/mol; Mn=25 000 g/mol, measured by gel permeation chromatography using dimethylacetamide as eluent and PMMA standards.

PESU for comparative experiments: Mw=55 000 g/mol; Mn=21 000 g/mol, measured by gel permeation chromatography using dimethylacetamide as eluent and PMMA standards.

Production of Copolymers:

Dichlorodiphenyl sulfone (DCDPS), dihydroxybiphenol (DHBP) and dihydroxydiphenyl sulfone (DHDPS) were dissolved in $K_2CO_3$ and NMP (start) (for quantitative data see table below). Once the temperature had reached 190° C., the solution was stirred for 4 h under nitrogen. The remaining NMP (end) was added, and, at a temperature of from 120° C. to 150° C., methyl chloride gas was supplied at 15 l/h for 1 h. The suspension was cooled and, at a temperature below 80° C., discharged, filtered, dropletized, washed with boiling water, and dried.

TABLE 1

Quantitative data for production of copolymers

| | Copo 1<br>20% PESU | Copo 2<br>30% PESU | Copo 3<br>40% PESU |
|---|---|---|---|
| DCDPS [g] | 574.16 | 574.16 | 574.16 |
| DHBP [g] | 303.89 | 265.26 | 226.25 |
| DHDPS [g] | 102.07 | 152.73 | 202.64 |
| K2CO3 [g] | 290.24 | 290.24 | 290.24 |
| NMP (start) [ml] | 1538 | 1538 | 1538 |
| NMP (end) [ml] | 1462 | 1462 | 1462 |

TABLE 2

Properties of copolymers

| | Molding composition No. | | | | | | |
|---|---|---|---|---|---|---|---|
| | 1 | 2 | 3 | c4 | c5 | c6 | c7 |
| | Constitution | | | | | | |
| | Copo 1<br>20% PESU<br>units | Copo 2<br>30% PESU<br>units | Copo 3<br>40% PESU<br>units | Mixture of<br>PPSU/PESU<br>(80/20) | PPSU | PESU | Copo according to<br>U.S. Pat. No. 5,326,834<br>40% PESU units |
| IV [ml/g] | 54.6 | 51.5 | 51.6 | 59.9 | 71.0 *) | 56.4- | 53.5 |
| MVR [cm³/10 min] | 50.0 | 66.6 | 59.7 | 13.7 | 11.8 | 43 | 49.6 |
| Appearance | transparent | transparent | transparent | opaque | transparent | transparent | transparent |
| Transparency [%] | 81.5 | 82.2 | 79.5 | n.m. | 76.0 | 85.3 | 78.6 |
| Haze [%] | 3.7 | 3.0 | 2.5 | n.m (because opaque) | 3.4 | 2.9 | 4.7 |
| Demolding force [N] | 2037 | 2258 | 2631 | 2970 | 2870 | 4705 | 2940 |
| Tensile strain at break εBr [%] | 70.7 | 71.0 | 68.4 | 30.4 | 17.8 | 42.1 | 62.3 |
| aK [kJ/m²] | 73.1 | 16.5 | 14.8- | 17.1 | >70 | 6.7 | 12.1 |

TABLE 2-continued

Properties of copolymers

| | Molding composition No. | | | | | | |
|---|---|---|---|---|---|---|---|
| | 1 | 2 | 3 | c4 | c5 | c6 | c7 |
| | | | | Constitution | | | |
| | Copo 1 20% PESU units | Copo 2 30% PESU units | Copo 3 40% PESU units | Mixture of PPSU/PESU (80/20) | PPSU | PESU | Copo according to U.S. Pat. No. 5,326,834 40% PESU units |
| aK [kJ/m$^2$] 200° C./ 250 h | 8.6 | 6.7 | 5.9 | 5.2 | 9.8 | 4.2 | 5.8 |
| Modulus of elasticity [MPa] | 2309.0 | 2369.0 | 2412 | 2359.0 | 2299.0 | 2710 | 2420 |

*) measured in 0.01 g/ml solution in phenol/1,2-dichlorobenzene (1/1)
n.m.: not measurable

TABLE 3

Apparent viscosity

| Apparent shear rate [1/s] | Copo 1 20% PESU units | Copo 2 30% PESU units | Copo 3 40% PESU units | PPSU | Apparent shear rate [1/s] | Apparent viscosity [Pa * s] PESU |
|---|---|---|---|---|---|---|
| 57.6 | 474.941 | 349.957 | 437.446 | 3012.13 | 45.6 | 549.213 |
| 115.2 | 424.947 | 331.209 | 412.449 | 2293.46 | 88.7 | 532.642 |
| 230.4 | 424.947 | 324.96 | | 1796.65 | 172.6 | 503.296 |
| 576 | 393.701 | 307.462 | 358.705 | 1196.1 | 335.9 | 455.072 |
| 576 | 389.952 | 306.212 | 357.456 | 1213.6 | 653.4 | 384.763 |
| 1152 | 342.457 | 274.966 | 311.211 | 839.896 | 1271.3 | 297.970 |
| 2304 | 259.968 | 218.098 | 236.846 | 539.933 | 2473.3 | 209.908 |
| 5760 | 147.857 | 129.859 | 136.233 | n.m. | 4811.8 | 136.083 |
| 11 520 | 91.7386 | 81.1149 | 84.4895 | n.m. | 9361.5 | 83.033 |
| | | | | | 18 213.0 | 48.751 | n.m.: not measurable

The invention claimed is:

1. A method for producing a feed container comprising utilizing a molding composition consisting essentially of a copolymer composed of
   (A) from 5 to 60% by weight of units of the formula (I)

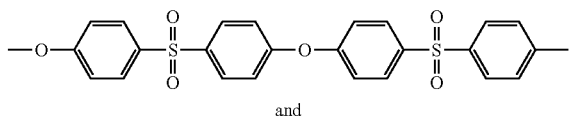

and (B) from 40 to 95% by weight of units of the formula (II)

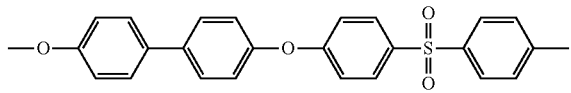

wherein the total of the proportions by weight of the units A and B does not exceed 100% by weight, based on the copolymer, and wherein the demolding force of the copolymer is from 1800 to 2800 N;
   wherein the feed container is a feed bottle.

2. The method according to claim 1 wherein the copolymer is composed of
   (A) from 5 to 50% by weight of units of the formula (I) and
   (B) from 50 to 95% by weight of units of the formula (II),
   wherein the total of the proportions by weight of the units A and B is 100% by weight, based on the copolymer.

3. The method of claim 1 wherein the copolymer is composed of
   (A) from 8 to 35% by weight of units of the formula (I) and
   (B) from 65 to 92% by weight of units of the formula (II),
   where the total of the proportions by weight of the units A and B is 100% by weight, based on the copolymer.

4. The method of claim 1 wherein the viscosity (MVR) of the molding composition, measured to EN ISO 1133:2005, is from 40 to 70 cm$^3$/10 min, measured for 365° C./5 kg.

5. The method of claim 1 wherein the haze value of a test specimen made of the molding composition is from 2.0 to 4.5, measured to DIN 53236.

6. The method of claim 1 wherein the transparency of a test specimen made of the molding composition is from 70% to 99%, measured to DIN 53236.

* * * * *